(12) United States Patent
Nakayama et al.

(10) Patent No.: US 12,382,354 B2
(45) Date of Patent: Aug. 5, 2025

(54) COMMUNICATION SYSTEM, CONNECTION DESIGNATION CONTROL METHOD, CONTROL APPARATUS AND PROGRAM

(71) Applicant: Nippon Telegraph and Telephone Corporation, Tokyo (JP)

(72) Inventors: Shota Nakayama, Musashino (JP); Daisuke Murayama, Musashino (JP); Kenichi Kawamura, Musashino (JP); Takatsune Moriyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 398 days.

(21) Appl. No.: 18/017,155

(22) PCT Filed: Jul. 27, 2020

(86) PCT No.: PCT/JP2020/028758
§ 371 (c)(1),
(2) Date: Jan. 20, 2023

(87) PCT Pub. No.: WO2022/024198
PCT Pub. Date: Feb. 3, 2022

(65) Prior Publication Data
US 2023/0269637 A1    Aug. 24, 2023

(51) Int. Cl.
*H04W 36/00* (2009.01)
*H04W 36/32* (2009.01)

(52) U.S. Cl.
CPC ... *H04W 36/00837* (2018.08); *H04W 36/322* (2023.05)

(58) Field of Classification Search
CPC .......... H04W 36/00837; H04W 36/32; H04W 36/322; H04W 36/0055; H04W 36/38; H04W 16/00; H04W 16/18; H04W 48/08; H04W 76/11
See application file for complete search history.

(56) References Cited

U.S. PATENT DOCUMENTS

| 10,820,263 | B1 * | 10/2020 | Barton | H04W 24/02 |
| 2008/0032727 | A1 * | 2/2008 | Stephenson | H04W 24/00 |
| | | | | 455/513 |
| 2015/0052255 | A1 * | 2/2015 | Sun | H04L 49/253 |
| | | | | 709/227 |

FOREIGN PATENT DOCUMENTS

WO    WO-2017088461 A1 *  6/2017   ............ H04W 36/00

OTHER PUBLICATIONS

[No Author Listed], "4 Architecture model and concepts," 3GPP TS 23.501 V16.4.0 (Mar. 2020) (Release 16), Mar. 2020, 430 pages.

* cited by examiner

*Primary Examiner* — Mohamed A Kamara
(74) *Attorney, Agent, or Firm* — Fish & Richardson P.C.

(57) ABSTRACT

A communication system includes a terminal configured to wirelessly communicate with a base station, a plurality of IoT terminals, and a control device. The control device includes a processor; and a memory that includes instructions, which when executed, cause the processor to execute the following steps: selecting an IoT terminal around a dead zone and transmitting a command of signal transmission to the selected IoT terminal. The selected IoT terminal includes a receiver configured to receive the command, and a transmitter configured to transmit a signal according to the command. The terminal receiving the signal transmitted from the selected IoT terminal performs a connection operation for avoiding the dead zone.

9 Claims, 14 Drawing Sheets

Fig. 9

| DETECTION POINT | DETECTED LOCATION | DEAD ZONE |
|---|---|---|
| DEAD POINT 1 | (p,q) | (p−R~p+R,q−R~q+R) |
| DEAD POINT 2 | (r,s) | (r−R~r+R,s−R~s+R) |
| DEAD POINT 3 | (t,u) | (t−R~t+R,u−R~u+R) |

⋮

COMMUNICATION SYSTEM, CONNECTION DESIGNATION CONTROL METHOD, CONTROL APPARATUS AND PROGRAM

CROSS-REFERENCE TO RELATED APPLICATIONS

This application is a National Stage application under 35 U.S.C. § 371 of International Application No. PCT/JP2020/028758, having an International Filing Date of Jul. 27, 2020. The disclosure of the prior application is considered part of the disclosure of this application, and is incorporated by reference in its entirety into this application.

TECHNICAL FIELD

The present invention relates to a technique for avoiding deterioration in communication quality and communication interruption in a wireless communication system.

BACKGROUND ART

In 3GPP, standardization of a wireless communication system called 5G (for example, Non Patent Literature 1) has progressed and 5G communication services have started. In addition, local 5G (L5G), which is a local 5G system constructed by companies and local governments, has also been studied and introduced.

5G has features such as an ultra-high speed, an ultra-low latency, and multiple simultaneous connections, and is expected to be applied to various kinds of radio access. In particular, in L5G, utilization of mission critical applications is also assumed, and maintenance of communication quality is more strictly required. In addition, since the introduction cost of L5G is high as compared with other wireless systems (a wireless LAN), etc., it is assumed that L5G will be introduced by narrowing down an area, like limiting the number of base stations, or the like.

CITATION LIST

Non Patent Literature

Non Patent Literature 1: 3GPP TS 23.501 V16.4.0 (2020-03) (Release 16), "4 Architecture Model and Concepts"

SUMMARY OF INVENTION

Technical Problem

In 5G, the frequency bands of 3.7 GHz, 4.5 GHz, and 28 GHz are utilized, and in L5G, the frequency bands of 4.5 GHz and 28 GHz are utilized.

However, in a high frequency band such as the millimeter wave band (28.2 to 29.1 GHz), radio waves highly tend to travel linearly, and, thus, an area or a dead zone may occur where it is difficult for radio waves to reach due to a column of a building or a shield. When a terminal (UE) enters an area or a dead zone where it is difficult for radio waves to reach, deterioration in communication quality (including communication interruption) may occur in some cases.

The present invention has been made in view of the above-mentioned points, and an object is to provide a technique for avoiding deterioration in communication quality caused by a terminal entering a dead zone in a wireless communication system.

Solution to Problem

According to the disclosed technique, there is provided a communication system including a terminal that wirelessly communicates with a base station by radio, a plurality of IoT terminals, and a control device,
in which the control device includes
an IoT terminal command unit that selects an IoT terminal around a dead zone and transmits a command of signal transmission to the selected IoT terminal,
the selected IoT terminal includes
a command reception unit that receives the command, and
a signal transmission unit that transmits a signal according to the command, and
the terminal receiving the signal transmitted from the selected IoT terminal performs a connection operation for avoiding the dead zone.

Advantageous Effects of Invention

According to the disclosed technique, there is provided a technique for avoiding deterioration in communication quality caused by a terminal entering a dead zone in a wireless communication system.

BRIEF DESCRIPTION OF DRAWINGS

FIG. 9 is a diagram showing an example of a DB storing dead zone information.

DESCRIPTION OF EMBODIMENTS

Hereinafter, an embodiment of the present invention (the present embodiment) will be described with reference to the drawings. The embodiment described below is merely an example, and embodiments to which the present invention is applied are not limited to the following embodiment.

In the present embodiment, a "dead zone" refers to an area where it is difficult for radio waves from a base station to reach mobile devices. The "area where it is difficult for radio waves to reach mobile devices" is, for example, an area where only radio waves with a power equal to or less than a certain threshold reach mobile devices (including an area where radio waves do not reach mobile devices at all). In addition, in the following description, the terminal is denoted as UE. UE is an abbreviation of user equipment.

Problem and Overview of Embodiment

First, an operation when the technique according to the embodiment of the present embodiment is not applied will be described with reference to FIG. 1 and FIG. 2.

Figure 1:
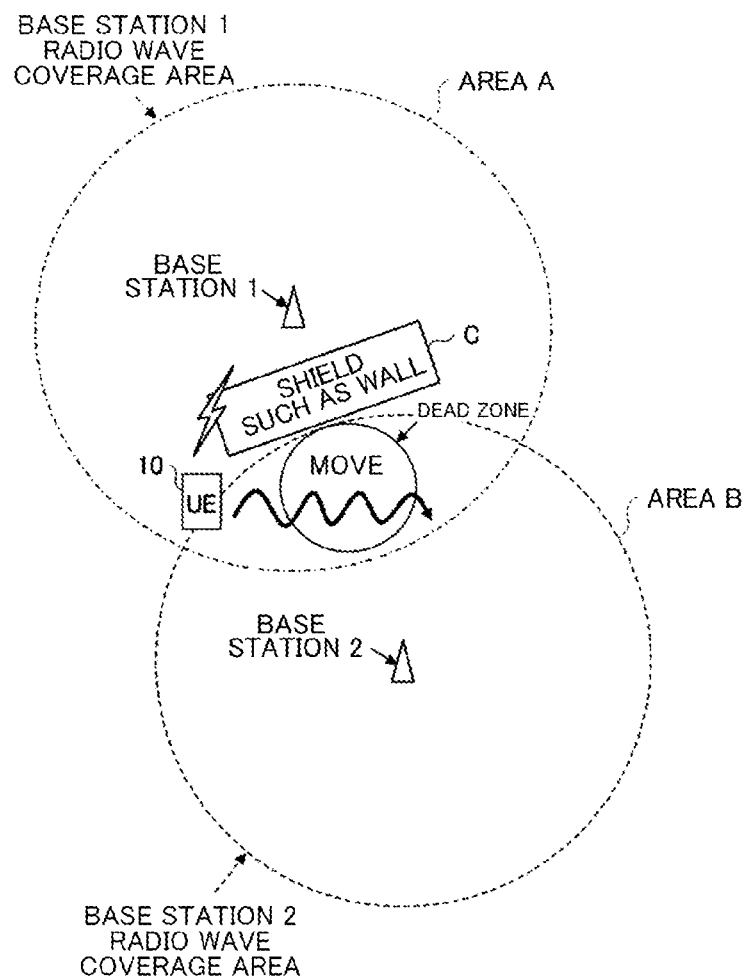
FIG. 1 is a diagram for illustrating a problem.

As shown in FIG. 1, there are a base station 1 and a base station 2, and the radio wave coverage areas of the base stations 1 and 2 are denoted by an area A and an area B. In the state shown in FIG. 1, a terminal 10 is connected to the base station 1. A shield C such as a wall exists at the illustrated position, and an area behind the shield C when viewed from the base station 1 is a dead zone.

Figure 2:
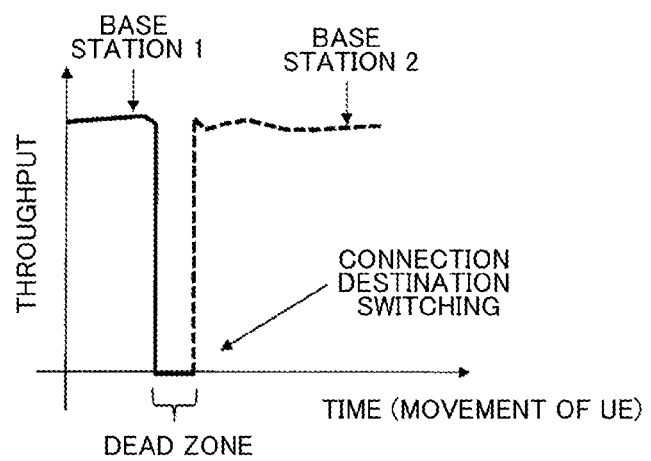
FIG. 2 is a diagram for illustrating a problem.

FIG. 2 shows a change in communication quality of the UE 10 (a throughput of the UE 10 as an example) when the UE 10 passes through the dead zone to move to the area B in the above-described environment. As shown in FIG. 2, the throughput is 0 while the UE 10 is passing through the dead zone.

In the present embodiment, in order to avoid deterioration in communication quality caused by an entry into the dead zone as described above, the IoT terminal is disposed in the service providing area, and a line switching instruction signal or a line duplication instruction signal is transmitted from an IoT terminal around the dead zone to the UE 10. At this time, the IoT terminal transmits, to the UE 10, a notification of, for example, information indicating that there is a dead zone associated with the base station, and thus the UE 10 can determine whether to execute an operation of switching the current access base station to another base station (an example of an access operation for avoiding the dead zone). Hereinafter, the present embodiment will be described in detail.

System Configuration

Figure 3:
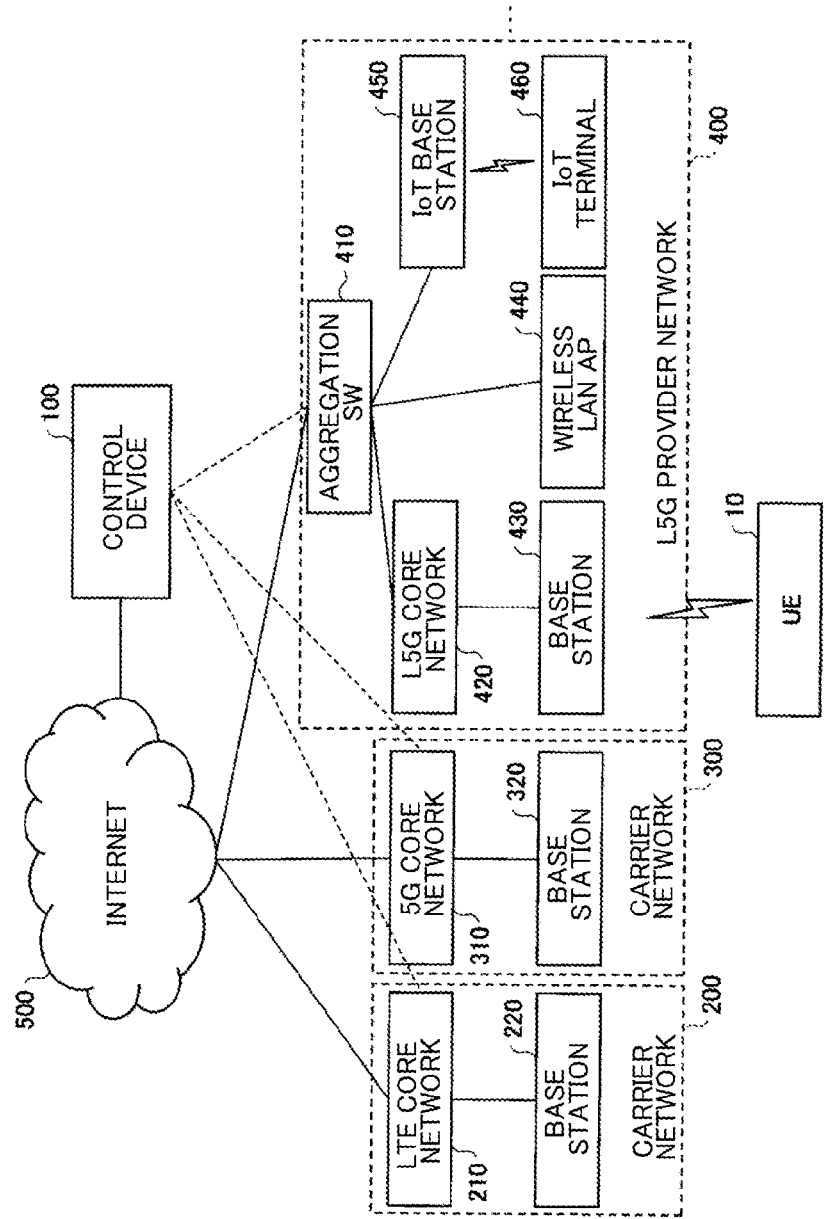
FIG. 3 is a diagram of a system configuration of an embodiment of the present invention.

FIG. 3 illustrates an example of an overall configuration of a communication system according to the present embodiment. As shown in FIG. 3, the present system includes a control device 100, a carrier network 200, a carrier network 300, an L5G provider network 400, and these elements are connected to the Internet 500. Furthermore, the UE 10 performs wireless communication with a base station 430 or the like of the L5G provider network 400 according to its own position.

The carrier network 200 includes an LTE core network 210 and a base station 220. Although only one base station or IoT base station is shown on each network in FIG. 3, this configuration is for the convenience of illustration, and a number of base stations and IoT base stations may actually exist.

The carrier network 300 has a 5G core network 310 and a base station 320. The L5G provider network 400 includes an aggregation SW 410, an L5G core network 420, the base station 430, a wireless LAN-AP 440, an IoT base station 450, and an IoT terminal 460.

With respect to any of the carrier network 200, the carrier network 300, and the L5G provider network 400, a plurality of wireless systems such as a wireless LAN-AP, an IoT terminal, and the like may be included in the network. FIG. 3 shows an example in which the wireless LAN-AP 440 and the IoT terminal 460 are present in the L5G provider network 400, as an example. Furthermore, in the example shown in FIG. 3, the IoT terminal 460 is connected to the IoT base station 450.

The "IoT terminal" in the present embodiment is assumed to include any device that can connect to a network. For example, the "IoT terminal" may be UE, a small terminal with limited functions, a PC, or large-sized equipment.

The control device 100 is a device that executes control processing according to the present invention together with the IoT terminal 460, a virtual server provided on a cloud, or a physical server provided on a physical network. The location where the control device 100 is disposed is not limited to a specific location, but a location may be determined according to a control range. For example, when it is assumed that the UE 10 connected to the L5G provider network 400 is to be controlled, the control device 100 may be installed at a location close to the L5G provider network 400.

Information from the UE 10 is transmitted to the control device 100 via a wireless system of a connection destination (LTE, 5G, L5G, wireless LAN, an IoT terminal, or the like).

Overview of Operation

An overview of an operation of the system according to the present embodiment will be described with reference to FIG. 4 and FIG. 5. A base station 1 and a base station 2 exist and radio wave coverage areas of the base stations 1 and 2 are denoted as an area A and an area B in FIG. 4, as in FIG. 1. A shield C such as a wall exists at the illustrated position, and an area behind the shield C when viewed from the base station 1 is a dead zone. Each of the base station 1 and the base station 2 may be a base station of any of the carrier networks 200 and 300 and the L5G provider network 500. In addition, the base station 1 and the base station 2 may each be a wireless LAN-AP.

In addition, a plurality of IoT terminals 30 (each corresponding to the IoT terminal 460 in FIG. 3) are disposed in the area A. In such an environment, the UE 10 moves from the area A to the area B passing through the dead zone.

The control device 100 stores location information of the dead zone and location information of each IoT terminal 30. The control device 100 selects an IoT terminal 30 capable of covering the dead zone, and transmits a command to the IoT terminal 30 to cause the selected IoT terminal 30 to transmit a signal to the UE 10. The IoT terminal 30 that has received the command transmits a signal.

Figure 4:
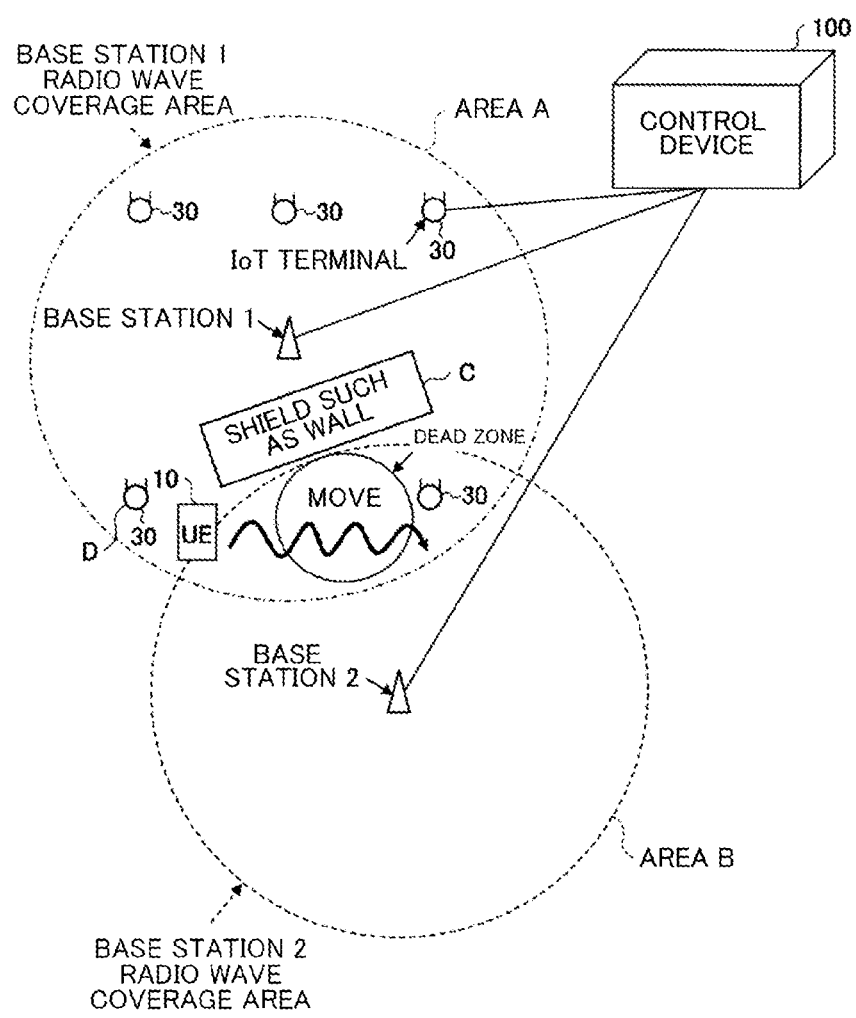
FIG. 4 is a diagram illustrating an overview of an operation of a system according to an embodiment of the present invention.
Figure 5:
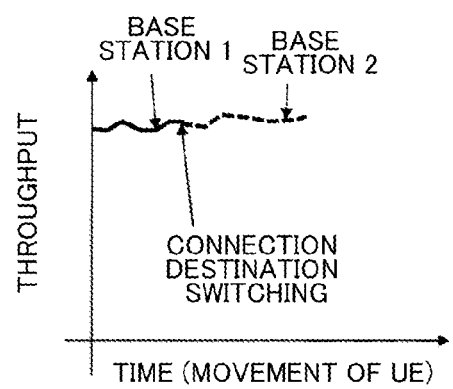
FIG. 5 is a diagram illustrating an overview of an operation of a system according to an embodiment of the present invention.

In the example shown in FIG. 4, for example, the IoT terminal 30 indicated by D transmits a signal. The UE 10 that has received the signal recognizes that the UE 10 itself is located around the dead zone, and switches the connection destination from the base station 1 associated with the dead zone to the base station 2. Alternatively, a duplication configuration in which both the base station 1 and the base station 2 serve as connection destinations may be adopted.

Since the UE 10 can communicate with the base station 2 before entering the dead zone by using the signal transmission from the IoT terminal 30 as described above, deterioration of communication quality caused by the dead zone associated with the base station 1 can be avoided. Thus, the connection destination can be switched from the base station 1 to the base station 2 without deterioration of communication quality as shown in FIG. 5.

Specific Example of Operation to Avoid Dead Zone

A specific example of the above-described operation will be described with reference to FIG. 6. In the example shown in FIG. 6, a plurality of IoT terminals 30 are disposed in a service providing area as shown in the figure. Further, there is a dead zone S for a base station 60 connecting to the UE 10.

The control device 100 stores location information of each dead zone associated with each base station and location information of each IoT terminal 30. The control device 100 selects an IoT terminal 30 around the dead zone for each dead zone associated with the base station based on the location information of each dead zone associated with each base station and the location information of each IoT terminal 30.

The IoT terminal 30 around the dead zone is, for example, an IoT terminal 30 located within a predetermined distance from the center of the dead zone. For example, when the dead zone is assumed to be a circle with a radius R, the control device 100 selects an IoT terminal 30 positioned in the circle centered at the dead zone with a radius R+r, as an IoT terminal 30 around the dead zone. R (r≥0) is a predetermined value.

For example, a user (a manager of a system) determines r according to the application scene. For example, R may be set to a large value when the user wants a coverage with a margin.

Figure 6:
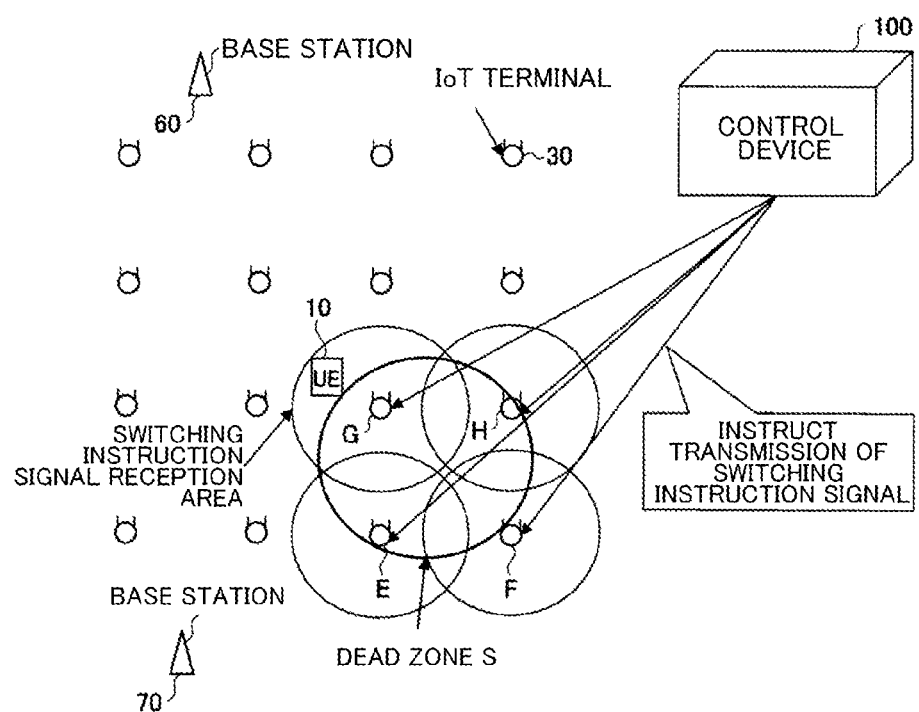
FIG. 6 is a diagram for illustrating an example of a detailed operation.

In the example shown in FIG. 6, the control device 100 selects four IoT terminals 30 indicated by E, F, G, and H with respect to the dead zone S.

The control device 100 transmits a command to transmit a switching instruction signal (or a command to transmit a line duplication instruction signal) to the selected IoT terminals 30. The IoT terminals 30 that have received the command (the "command" may be replaced with an "instruction") transmit a signal to cause the UE 10 to execute a connection operation for avoiding the dead zone. The signal may be referred to as a switching instruction signal (or a line duplication instruction signal).

The command transmitted from the control device 100 to the selected IoT terminals 30 may include information of transmission powers of the IoT terminals 30. The IoT terminals 30 that have received the information transmits a signal with a transmission power specified in the information. Thus, the control device 100 can control the size of an area where the UE 10 can receive a signal for each of the IoT terminals 30.

Regarding Details of Command and Signal

There are two patterns (patterns 1 and 2) for a command transmitted to the IoT terminals 30 by the control device 100 and a signal to be transmitted by the IoT terminals 30 in cases where the control device 100 determines a switching destination or the UE 10 determines a switching destination. A "switching destination" in the following description also includes the meaning of another connection destination used in the duplication configuration.

(1) Pattern 1

When the control device 100 determines a switching destination, the control device 100 transmits, to a selected IoT terminal 30, information of the base station associated with the dead zone (information indicating that there is a dead zone associated with the base station) and a command including base station information of the switching destination. The IoT terminal 30 transmits a signal including the information of the base station associated with the dead zone and the base station information of the switching destination.

For example, in the example shown in FIG. 6, the IoT terminal 30 (G) transmits, to the UE 10 connected to the base station 60, information indicating that there is the dead zone S associated with the base station 60 (e.g., an identifier of the base station 60 associated with the dead zone S) and information indicating that the switching destination is the base station 70.

Because the UE 10 that has received the information is connected to the base station 60, the UE 10 determines that switching (or duplication) is needed to avoid the dead zone, and performs a switching operation (or a duplication operation) with respect to the instructed base station 70.

(2) Pattern 2

When the UE 10 determines a switching destination, the control device 100 transmits, to a selected IoT terminal 30, a command including information of the base station associated with the dead zone (which is information indicating that there is a dead zone associated with the base station), and the IoT terminal 30 transmits the information of the base station associated with the dead zone.

In the example shown in FIG. 6, for example, the IoT terminal 30 (G) transmits, to the UE 10 connected to the base station 60, the information indicating that there is the dead zone S associated with the base station 60 (e.g., an identifier of the base station 60 associated with the dead zone S).

Because the UE 10 that has received the information is connected to the base station 60, the UE 10 determines that switching (or duplication) is needed to avoid the dead zone, selects the base station 70 which is a nearby base station to which the UE 10 can connect to, and switches the connection destination to the base station 70. Alternatively, the UE may be connected to both the base station 60 and the base station 70 to adopt a duplication configuration.

Because the IoT terminal 30 transmits the information of the base station associated with the dead zone as described above, the UE 10 that has received the information can determine whether to perform switching (or adopt duplication) by comparing the base station that the UE 10 is connecting to with the base station indicated in the received information.

Although a communication method between the IoT terminal 30 and the UE 10 is not limited to a specific method, for example, a dedicated beacon, a Bluetooth (registered trademark), Wi-Fi Direct (registered trademark), Sidelink, or the like can be used.

Dead Zone Calculation Method

Next, a dead zone calculation method will be described. In this embodiment, although the control device 100 performs a dead zone calculation process, this is an example. A device other than the control device 100 may perform the dead zone calculation process, and the control device 100 may receive information of the dead zone from the device.

Figure 7:
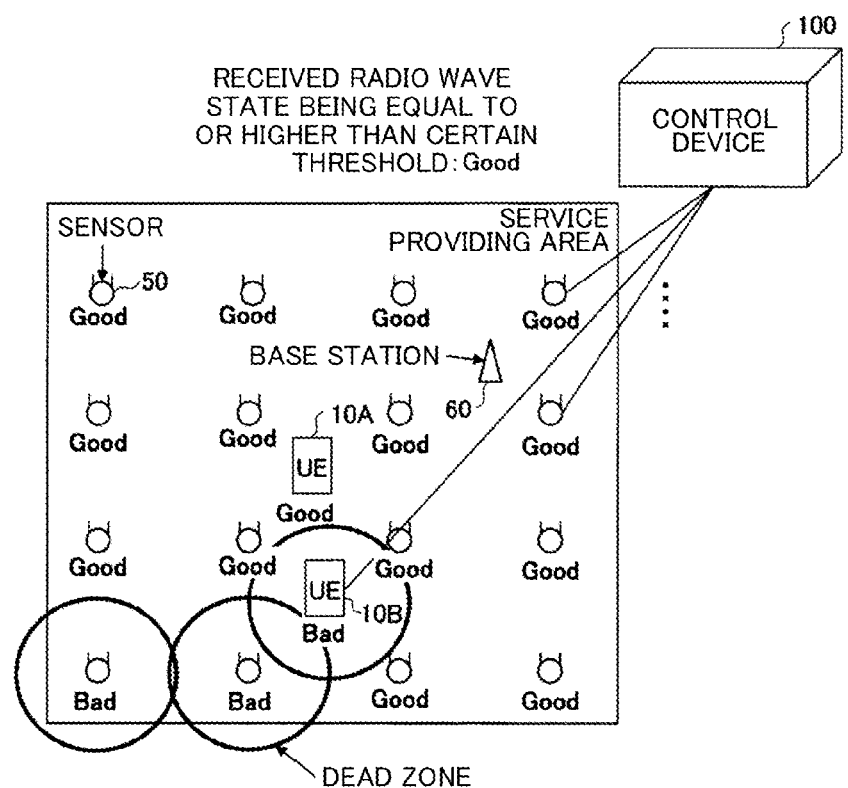
FIG. 7 is a diagram for illustrating a dead zone calculation method.

In the present embodiment, a plurality of sensors 50 are disposed in a service providing area as shown in FIG. 7. The service providing area is a service providing area of a base station. FIG. 7 shows a service providing area of the base station 60 as an example.

Each sensor 50 has a function of measuring reception quality and feeding back the measurement result to the control device 100. Each UE (UE 10A and UE 10B are shown in FIG. 7) also has a function of measuring reception quality and feeding back the measurement result to the control device 100.

The sensors 50 and the base station 60 may be connected wirelessly or by wire. In the case where the sensors 50 and the base station 60 are wirelessly connected, each sensor 50 has a function of communicating with the base station as the UE 10 does, and can transmit a feedback signal to the base station 60 by using a user data area or a control message using allocation from the base station 60.

Figure 8:
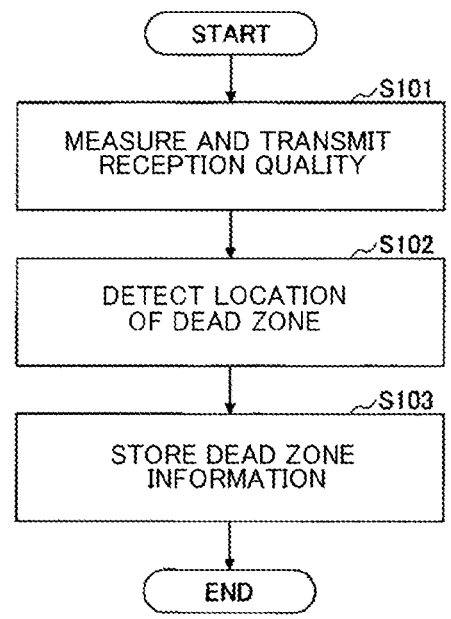
FIG. 8 is a flowchart for illustrating the dead zone calculation method.

An example of a dead zone calculation procedure will be described with reference to the flowchart of FIG. 8. As an assumption of the processing shown in FIG. 8, it is assumed that the control device 100 has already stored location information of each sensor 50. In addition, the processing shown in FIG. 8 is performed for each base station. In other words, the information of the dead zone is obtained by each base station. In addition, the processing shown in FIG. 8 is periodically executed. That is, the information of the dead zone is updated periodically.

S101

In S101, each sensor 50 measures reception quality (reception radio wave information), and transmits the result to the control device 100. Each UE 10 transmits its own location information and the reception quality to the control device 100.

The UE 10 is equipped with a GPS device for the location information of the UE 10 and the location information obtained by the GPS device is assumed to be transmitted from the UE 10 to the control device 100, however a method for collecting the location information is not limited to this method. For example, a sensor provided around the UE 10 (a roadside, etc.) may acquire location information of the UE 10 and transmit the location information to the control device 100.

In addition, although the location information of the UE 10 collected by the control device 100 is, for example, x-y coordinates, latitude, and longitude, location information is not limited to them, and may include three-dimensional location information including a height.

Further, the control device 100 may collect barometric pressure sensor information at the location of the UE 10 (barometric pressure at the position of the UE 10) in addition to the (two-dimensional) location information of the UE 10. The control device 100 can acquire the location of the UE 10 in the height direction based on the barometric pressure sensor information. The location in the height direction can be used when considering the location of the UE 10 three-dimensionally, such as the location of the UE in a building. In addition, the control device 100 may collect, from the UE 10, the intensity of a radio wave from a base station with respect to the UE 10. The barometric pressure sensor information may be information on the barometric pressure sensor included in the UE 10 or information of a barometric pressure sensor around the UE 10.

The reception quality may be, for example, any one of SS-RSRP, CSI-RSRP, NR-RSSI, CSI-RSSI, SS-RSRQ, CSI-RSRQ, SS-SINR, and CSI-SINR, or a combination thereof. For the transmission of the reception quality, uplink communication of a target radio system may be used, or another access means such as a wired connection or a wireless LAN may be used.

S102

In S102, the control device 100 determines the location where the dead zone is detected based on the received reception quality and location information associated with the sensor 50 and the UE 10 serving as transmission sources of the reception quality.

For example, if the reception quality received from a sensor at a certain location is equal to or higher than a predetermined threshold, the control device 100 determines that the reception radio wave state at the location is fine (Good), and if the reception quality is not equal to or higher than the predetermined threshold, it is determined that the reception radio wave state at the location is poor (Bad).

The control device 100 determines a location where it is determined that the reception radio wave state is poor (Bad) as a position of the dead zone. Although it is assumed that the location is a two-dimensional location expressed by x-y coordinates, longitude, latitude, etc., a three-dimensional location may be used by adding the height direction (a z-axis direction) in a case where an indoor facility or the like is a subject. In a case of a three-dimensional location, the dead zone has a three-dimensional shape (for example, a sphere).

S103

In S103, the control device 100 determines the range of a radius R from the location at which the dead zone has been detected as a dead zone, and stores the information of the dead zone (e.g., the radius of the circle and the central position) in a DB. R is a predetermined value. Setting the dead zone as described above is an example.

FIG. 9 shows an example of the information of the dead zone stored in a DB. In the example shown in FIG. 9, information of the location of detected dead points and the dead zone is stored with respect to each of the dead points. In FIG. 9, for example, (p−R~p+R, q−R~q+R) means a circle with a radius R centered at a point (p, q).

Figure 10:
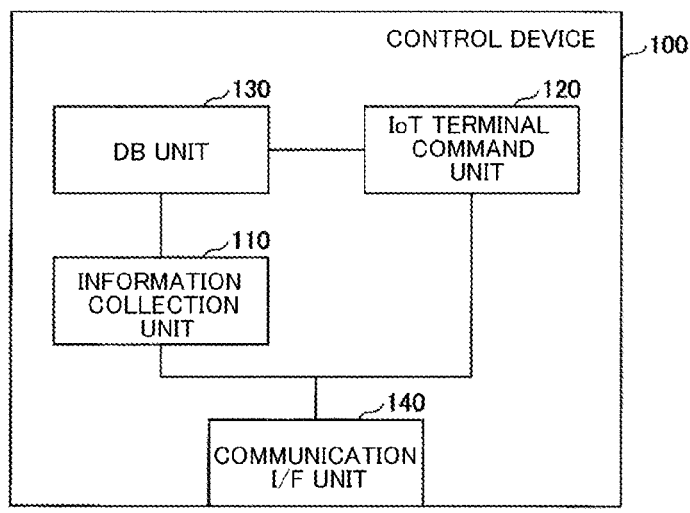
FIG. 10 is a functional configuration diagram of a control device 100.

Device Configuration Example and Operation Example of Control Device and IoT Terminal Next, a device configuration example of the control device 100 and the IoT terminal 30 that execute the above-described processing will be described. FIG. 10 is a diagram showing a functional configuration example of the control device 100. As illustrated in FIG. 10, the control device 100 includes an information collection unit 110, an IoT terminal command unit 120, a DB unit 130, and a communication I/F unit 140.

The information collection unit 110 collects UE information (a location, an intensity of radio waves received from a base station, barometric pressure information, and the like) from the UE 10. In addition, when the control device 100 calculates a dead zone, the information collection unit 110 collects reception quality from the sensor 50 and the UE 10, and calculates the dead zone. Furthermore, when the control device 100 does not calculate a dead zone, the information collection unit 110 receives information of a calculated dead zone from another device.

The IoT terminal command unit 120 selects an IoT terminals 30 around the dead zone using the method described with reference to FIG. 6, and transmits a command of signal transmission to the selected IoT terminal 30. In addition, it is possible to control the transmission power of the IoT terminal 30 to adjust an area in which a signal transmitted from the IoT terminal 30 reaches the UE. Furthermore, the IoT terminal command unit 120 can also instruct the IoT terminal 30 to stop transmission of a signal after instructing the IoT terminal 30 to start the transmission.

The DB unit 130 stores the location information of each IoT terminal 30 and the information (e.g., FIG. 9) collected or calculated by the information collection unit 110. The communication I/F unit 140 performs transmission and reception of data.

Figure 11:
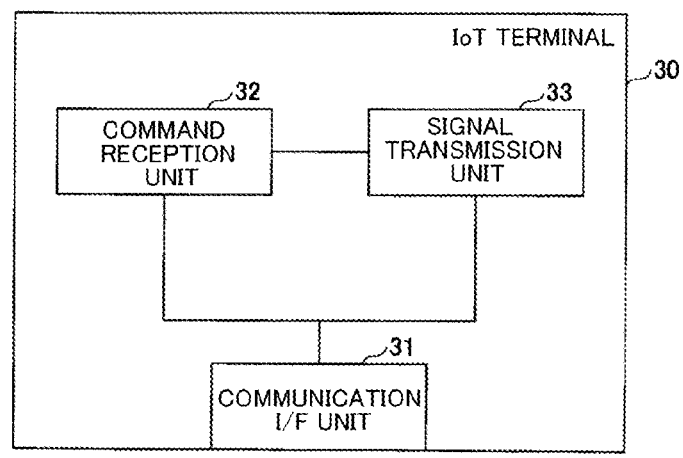
FIG. 11 is a functional configuration diagram of an IoT terminal 30.

FIG. 11 is a diagram illustrating a functional configuration example of the IoT terminal 30. As illustrated in FIG. 11, the IoT terminal 30 includes a communication I/F unit 31, a command reception unit 32, and a signal transmission unit 33.

The communication I/F unit 31 is an I/F for communicating with an IoT base station or transmitting a signal to the UE 10.

The command reception unit 32 receives a signal transmission command from the control device 100. The signal transmission unit 33 generates a signal (a switching instruction signal (or a duplication instruction signal)) and transmits the signal. Details of the commands and signals to be transmitted and received are as described with reference to FIG. 6.

Figure 12:
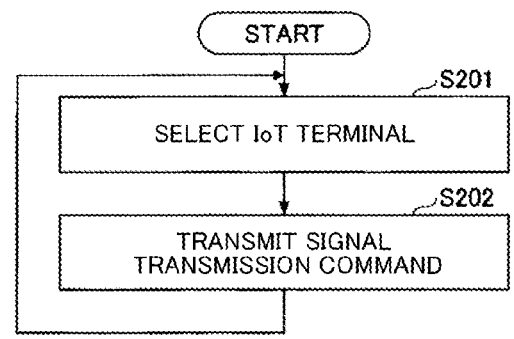
FIG. 12 is a flowchart for illustrating an operation of the control device 100.

An operation example of the control device 100 with the configuration illustrated in FIG. 10 will be described with reference to the flowchart of FIG. 12. In the following flow, it is assumed that dead zone information and location information of the IoT terminal 30 have already been stored in the DB unit 130.

In S201, the IoT terminal command unit 120 selects an IoT terminal 30 by comparing the dead zone information with the location information of the IoT terminal 30. The selection method is as described above. In S202, the IoT terminal command unit 120 instructs the selected IoT terminal 30 with a signal transmission command.

Figure 13:
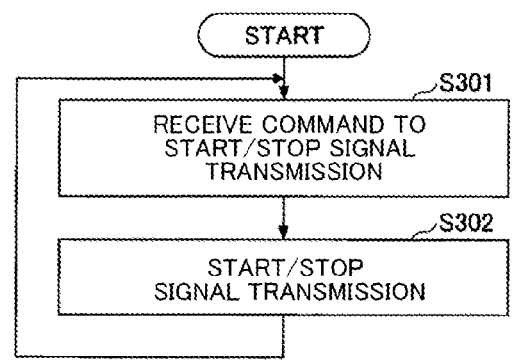
FIG. 13 is a flowchart for illustrating an operation of the IoT terminal 30.

An operation example of the IoT terminal 30 with the configuration illustrated in FIG. 11 will be described with reference to the flowchart of FIG. 13.

In S301, when the command reception unit 32 receives a command to start transmission of a signal from the control device 100, the signal transmission unit 33 starts transmission of the signal in S302.

In S301, when the command reception unit 32 receives, from the control device 100, a command to stop transmission of a signal, the signal transmission unit 33 stops transmission of the signal in S302.

Hardware Configuration Example

The control device 100, the IoT terminal 30, and the UE 10 in the present embodiment (including a modified example) can be implemented, for example, by causing a computer to execute a program describing the processing details described in the present embodiment. A "computer" used as the control device 100 may be a physical machine or a virtual machine on a cloud. When a virtual machine is used, the "hardware" described here is virtual hardware.

The above-described program can be recorded on a computer-readable recording medium (a portable memory or the like), and the program may be stored and distributed. In addition, it is also possible to provide the program through a network such as the Internet or an e-mail.

Figure 14:
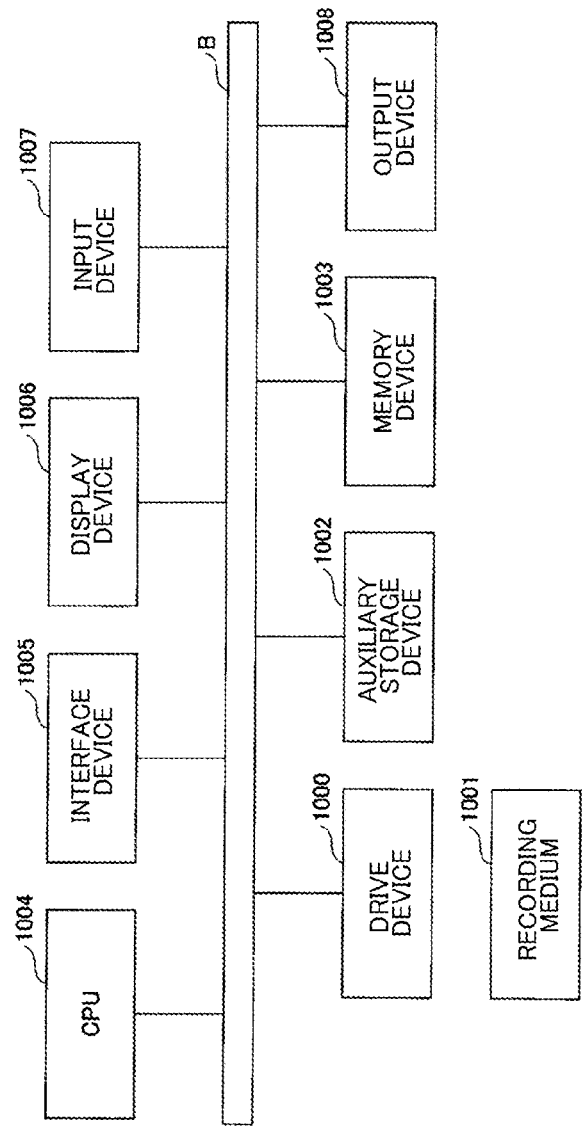
FIG. 14 is a diagram illustrating a hardware configuration example of a device.

FIG. 14 is a diagram illustrating an example of a hardware configuration of the computer. The computer of FIG. 15 includes a drive device 1000, an auxiliary storage device 1002, a memory device 1003, a CPU 1004, an interface device 1005, a display device 1006, an input device 1007, an output device 1008, and the like, which are connected to each other by a bus BS.

A program for implementing processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program does not necessarily have to be installed from the recording medium 1001, and may be downloaded from another computer via a network. The auxiliary storage device 1002 stores the installed program and also stores necessary files, data, and the like.

The memory device 1003 reads and stores the program from the auxiliary storage device 1002 when there is an instruction to start the program. The CPU 1004 implements the functions pertaining to the control device 100, the IoT terminal 30, or the UE 10 in accordance with the program stored in the memory device 1003. The interface device 1005 is used as an interface for connecting to a network, and functions as a transmission unit and a reception unit. The display device 1006 displays a graphical user interface (GUI) and the like for the program. The input device 1007 is configured of a keyboard, a mouse, buttons, a touch panel, or the like, and is used to input various operation instructions. The output device 1008 outputs a calculation result.

Note that the display device 1006 and the input device 1007 may not be provided in the IoT terminal 30.

Advantageous Effects of Invention

Using the technique according to the present embodiment described above, it is possible to perform switching to another line or redundancy by connecting to a plurality of lines before the UE 10 enters a dead zone, and as a result, deterioration in communication quality and instantaneous interruption can be avoided.

Conclusion of Embodiments

The present specification at least describes a communication system, a connection destination control method, a control device, and a program described in each clause.

Clause 1

A communication system including:
a terminal configured to wirelessly communicate with a base station, a plurality of IoT terminals, and a control device,
wherein the control device includes
an IoT terminal command unit configured to select an IoT terminal around a dead zone and transmit a command of signal transmission to the selected IoT terminal,
the selected IoT terminal includes
a command reception unit configured to receive the command, and
a signal transmission unit configured to transmit a signal according to the command, and
the terminal receiving the signal transmitted from the selected IoT terminal performs a connection operation for avoiding the dead zone.

Clause 2

The communication system described in clause 1, wherein the IoT terminal command unit transmits the command including information of a base station associated with the dead zone to the selected IoT terminal.

Clause 3

The communication system described in clause 1 or 2, wherein the IoT terminal command unit transmits the command including the information of the base station associated with the dead zone and information of a base station as a switching destination for avoiding the dead zone to the selected IoT terminal.

Clause 4

The communication system described in any one of clauses 1 to 3, wherein the control device further includes an information collection unit configured to calculate the dead zone based on reception qualities received from a plurality of sensors.

Clause 5

A connection destination control method for a communication system including a terminal configured to wirelessly communicate with a base station, a plurality of IoT terminals, and a control device, the connection destination control method including
- selecting an IoT terminal around a dead zone and transmitting a command of signal transmission to the selected IoT terminal by the control device,
- receiving the command and transmitting a signal according to the command by the selected IoT terminal, and performing a connection operation for avoiding the dead zone by the terminal receiving the signal transmitted from the selected IoT terminal.

Clause 6

A control device in a communication system including a terminal configured to wirelessly communicate with a base station, a plurality of IoT terminals, and the control device, the control device including an IoT terminal command configured to select an IoT terminal around a dead zone, and transmit, to the selected IoT terminal, a command to transmit a signal for causing the terminal to perform a connection operation for avoiding the dead zone.

Clause 7

The control device described in clause 6, wherein the IoT terminal command unit transmits the command including information of a base station associated with the dead zone to the selected IoT terminal.

Clause 8

A program for causing a computer to function as a unit of the control device described in clause 6 or 7.

Although the embodiment has been described above, the present invention is not limited to such a specific embodiment, and various modifications and changes can be made within the scope of the gist of the present invention described in the claims.

REFERENCE SIGNS LIST

10 Terminal (UE)
30, 460 IoT terminal
31 Communication I/F unit
32 Command reception unit
33 Signal transmission unit
50 Sensor
60, 70, 220, 320, 430
100 Control device
110 Information collection unit
120 IoT terminal command unit
130 DB unit
140 Communication I/F unit
200, 300 Carrier network
210 LTE core network
310, 420 5G core network
400 L5G provider network
500 Internet
410 Aggregation SW
440 Wireless LAN-AP
450 IoT base station
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system comprising:
a user equipment configured to wirelessly communicate with a first base station;
a plurality of IoT terminals; and
a control device,
wherein the control device includes
a processor; and
a memory that includes instructions, which when executed, cause the processor to execute the following step operations comprising:
selecting an IoT terminal around a dead zone; and
transmitting a command of signal transmission to the selected IoT terminal,
wherein the command includes information of the first base station associated with the dead zone and information of a second base station as a switching destination,
wherein the selected IoT terminal includes
a receiver configured to receive the command, and
a transmitter configured to transmit a signal according to the command, and
wherein the user equipment receiving the signal transmitted from the selected IoT terminal is configured to be connected to both the first base station and the second base station to avoid the dead zone.

2. The communication system according to claim 1, wherein the processor of the control device further calculates the dead zone based on reception qualities received from a plurality of sensors.

3. The communication system according to claim 1, wherein the dead zone is behind a shield.

4. The communication system according to claim 3, wherein the shield is a building or a wall.

5. The communication system according to claim 1, wherein the command further comprises a transmission power associated with the selected IoT terminal, wherein the transmitter of the selected IoT terminal is configured to transmit the signal having the transmission power to the user equipment.

6. A connection destination control method for a communication system including a user equipment configured to wirelessly communicate with a first base station, a plurality of IoT terminals, and a control device, the connection destination control method comprising:

selecting an IoT terminal around a dead zone and transmitting a command of signal transmission to the selected IoT terminal by the control device, wherein the command includes information of the first base station associated with the dead zone and information of a second base station as a switching destination;

receiving the command and transmitting a signal according to the command by the selected IoT terminal; and connecting to both the first base station and the second base station to avoid the dead zone by the user equipment receiving the signal transmitted from the selected IoT terminal.

7. A control device in a communication system including a user equipment configured to wirelessly communicate with a first base station, a plurality of IoT terminals, and the control device, the control device comprising:

a processor; and a memory that includes instructions, which when executed, cause the processor to execute operations comprising:

selecting an IoT terminal around a dead zone, and transmitting, to the selected IoT terminal, a command including information of the first base station associated with the dead zone and information of a second base station as a switching destination, the command enabling the selected IoT terminal to transmit a signal for causing the user equipment to connect to both the first base station and the second base station to avoid the dead zone.

8. The control device according to claim 7, wherein the processor transmits the command including information of the first base station associated with the dead zone to the selected IoT terminal.

9. A non-transitory computer readable storage medium storing a program, which when executed, causes a computer to function as the control device according to claim 6.

* * * * *